May 2, 1967 R. W. WILLIAMS ET AL 3,316,833
CAGED BAGEL COOKER
Filed Aug. 19, 1966
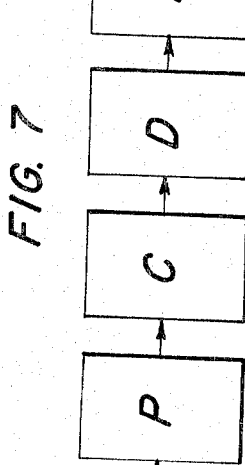
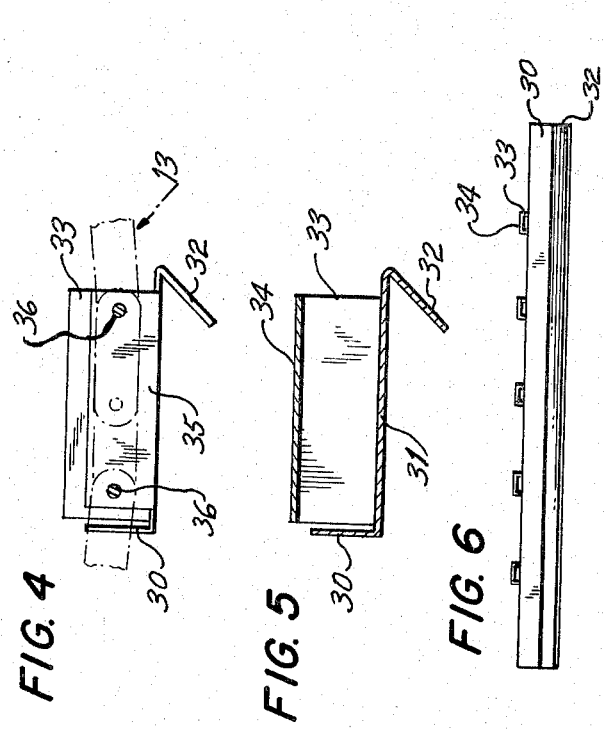
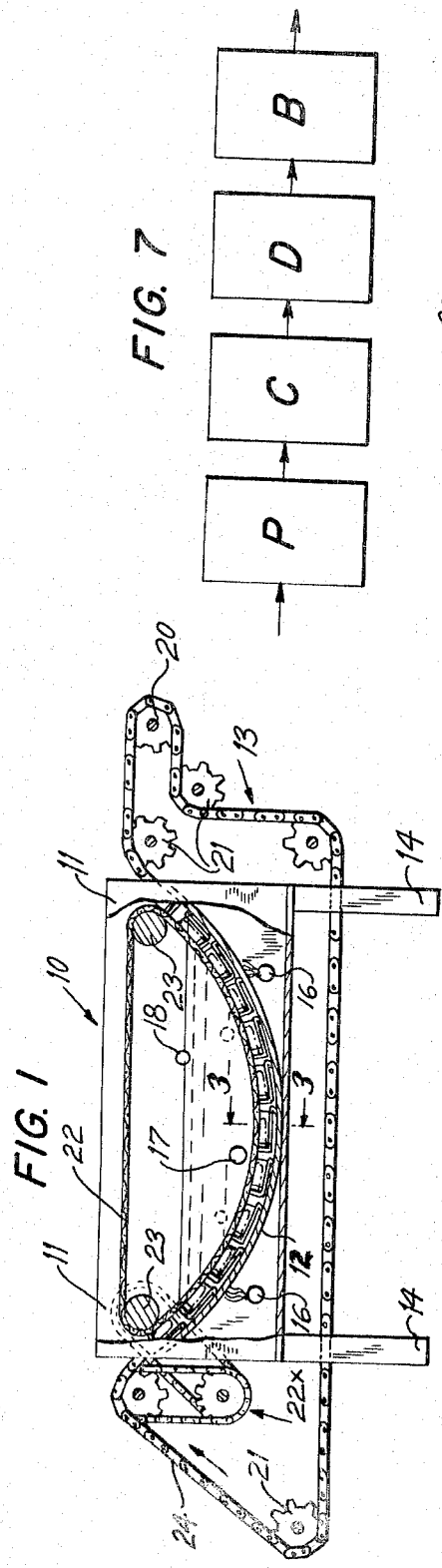
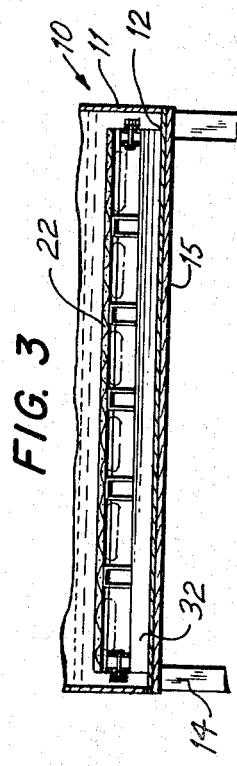
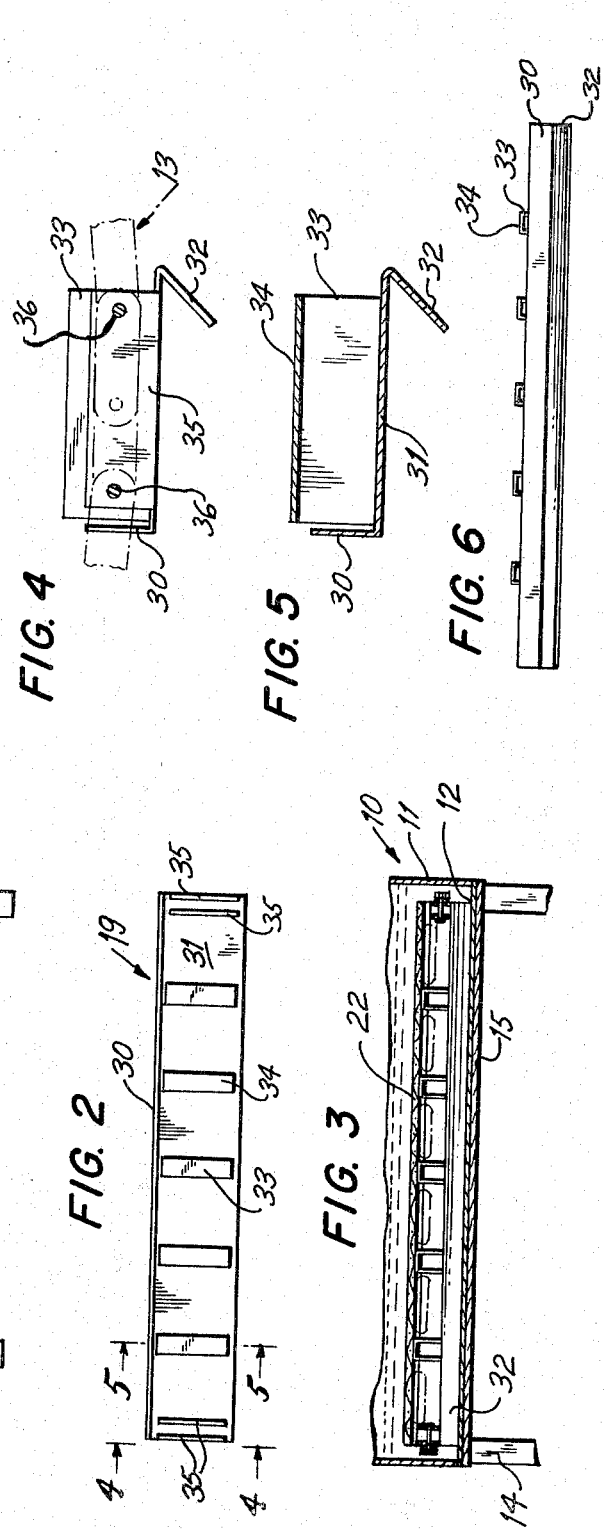

3,316,833
CAGED BAGEL COOKER

Robert W. Williams, Brookville Road, Brookville, N.Y.; and Robert Laurita, 3 Dolphin Lane, West Islip, N.Y. 11795
Filed Aug. 19, 1966, Ser. No. 573,686
5 Claims. (Cl. 99—404)

This invention relates to a device for boiling a bagel in a confined space or chamber.

In the preparation of bagels, it is necessary to cook or boil the raw bagel in water for a few minutes to prepare the bagel surface for baking to thereby obtain a glossy surface free from surface cracks.

In present day practice bagels are manually introduced into a pot of furiously boiling water and boiled for a few minutes. The boiled bagels are then removed manually using a sieve.

In such a pot procedure, the bagels contact one another so that they stick to one another or contact one another to prevent the boiling water from engaging the entire surface of the bagel.

It is an objective of this invention to provide an automatic bagel cooker.

It is another objective to prevent bagel to bagel contact during the cooking procedure.

These and other objectives of this invention will become apparent on reading the following descriptive disclosure of an illustrative embodiment of this invention.

According to this invention, the bagels are each confined to a moving chamber and are cooked or boiled in this chamber thereby preventing any contact whatsoever between the various bagels being cooked.

This invention is illustrated in the accompanying drawing in which;

FIG. 1 is a section schematic view of the bagel cooker the tank of which has a curved bottom wall and showing the continuous slat type conveyor used to propel the bagels into, through and out of said tank, FIG. 2 is a top elevation view of a single slat of the many slatted conveyor showing a plurality of separator walls welded to the top surface of the slat to form the side walls of the bagel chambers and further showing an upright rear wall used for confining and propelling the bagel through the boiling water, FIG. 3 is a section view taken on line 3—3 of FIG. 1, FIG. 4 is a detail view showing the manner of securing the co-acting links of the conveyor chain to one side of a slat and taken on line 4—4 of FIG. 2, FIG. 5 is a transverse section view taken through a slat on line 5—5 of FIG. 2, FIG. 6 is a rear view of a slat, and FIG. 7 is a block diagram of the process for making automatically bagels according to this invention.

Turning to the drawing and FIG. 1 in particular, the bagel cooker is provided with a tank 10 having a pair of opposed side walls 11 and a curved bottom wall 12 along and upon which the slatted conveyor 13 travels.

The tank is supported on a plurality of legs 14. A bottom support plate 15 is secured to the legs 14 to support the curved tank wall 12.

A plurality of gas burners 16 are disposed suitably beneath the curved bottom tank wall 12 to provide heat to effect a furious boiling of the water in the tank.

The tank is preferably provided with an inlet water orifice 17 and an outlet water orifice 18.

As shown in FIG. 1, the conveyor for the bagels is of the slat type with novel slats 19 (FIG. 2) to confine and propel the bagels through the boiling water. The stainless steel conveyor 13 of FIG. 1 is shown schematically in that the conveyor slats are shown only in the tank section of the conveyor, the rest of the conveyor 13 being shown in the form of the end view of the chain links.

The conveyor 13 is of the endless slat type being a plurality of adjacent slats each secured at each end to a link chain adapted to engage a sprocket driver wheel 20 and a plurality of support sprocket idler wheels 21.

Also as shown in FIG. 1, the tank 10 is provided with a continuous conventional stainless steel chain conveyor 22 supported on suitable spaced idler rollers 23 disposed suitably in the opposing tank side wall 11. The mesh 22 of suitable open area is propelled by drive 22X and is in engagement with the top of the slats 19. The driver wheel 20 is motivated by a suitable electric motor.

An important feature of this invention is the provision of novel slats 19 to form bagel cooking chambers and to effect a simultaneous turbulent flow-through washing away of starch therein.

The bagels are loaded on the conveyor at area 24 and pass into the tank 10 over the inlet end of the curved bottom wall 12 and are removed over the outlet end of the tank wall and drop off the conveyor upon passing over the driver wheel 20.

An important feature of this invention is the formation of the slat conveyor 13 from novel bagel confining slats 19. These slats used adjacent to one another with provision for passage of boiling water between the slats form five walls of the bagel confining chamber with the sixth or top wall being formed continuously as needed in the boiling water area by the chain or screen conveyor 22.

Turning to FIGS. 2 to 6, a slat 19 is provided with a stainless steel sheet metal plate bent to form a rear upright wall 30, a floor area 31 and a rearwardly bent lip 32. A plurality of U-shaped separators 33 of stainless steel and of suitable predetermined height to engage the screen conveyor 22 are welded at suitable intervals to form bagel confining chambers. The separators 33 are disposed in suitable spaced relationship to the rear wall 30 to permit flow of water therethrough as the conveyor moves forwardly.

The top wall 34 is the area of the separators that engages the screen conveyor 22.

The ends of the slats 19 are each provided with a pair of individual upright walls 35 welded to the floor section 31 and a pair of axles 36 are journaled through these walls and through the links in a conventional manner.

By the use of the automatic bagel cooker of this invention, it is possible to make a fully automatic bagel making system, using individual units that automatically transfer the treated bagel.

The individual units of this automated system are the proofer P, cooker C, the dryer D, and the baker B.

In the proofer P, the bagels are conditioned at a suitable humidity and temperature while traveling on a moving conveyor at about sixteen bagels abreast of one another.

The conditioned bagels are automatically transferred to the cooker at area 24 (FIG. 1) and the bagels are then cooked for a suitable number of minutes while traveling in the boiling water of tank 10 as determined by the speed of travel of the conveyor 13.

The cooked bagels are then transferred over the roller 20 onto an adjacent moving conveyor of a dryer D.

After being dried the bagels are then transferred similarly to the moving conveyor of the baker B.

We claim:

1. An automatic bagel cooker adapted to boil bagels out-of-contact of one another comprising a tank having a continuous depending suitably wide curved bottom wall from end to end and a pair of side walls; a continuous slat conveyor having separator walls thereon adapted to transport a plurality of spaced-apart bagels abreast of one another on each slat thereof, said conveyor extending suitably exteriorly of the tank at the inlet end to receive uncooked bagels, along the top surface of the tank bottom wall and then extending suitably exteriorly of the tank at the outlet end to discharge the cooked bagels; means for driving said slat conveyor at a suitable predetermined speed to effect cooking during travel through said tank; and suitably wide continuous screen conveyor means disposed within said tank and adapted to frictionally engage the separator walls of said slats to form the top wall of moving bagel confining chambers in the boiling water of said tank.

2. The bagel cooker of claim 1 wherein the slats are each provided with a rear wall and wherein the separator walls are of inverted U-shape, configuration suitably spaced from said rear wall to permit flow of water therethrough.

3. The cooker of claim 2 wherein the screen conveyor is disposed on a pair of suitably spaced-apart idler rollers disposed in the side walls of said tank above said curved bottom wall, said screen conveyor frictionally engaging the top separator walls of said slat conveyors to effect an identical speed of said screen conveyor and said slat conveyor.

4. The cooker of claim 3 wherein said slat conveyor is provided with opposed link chain secured to each of said slats on each end and adapted to engage sprocket wheels of a driver wheel and a plurality of idler wheels.

5. The cooker of claim 4 comprising pipe heating means disposed beneath said curved bottom wall of said tank to effect a furious boiling of the water therein, said slats having a rearwardly bent lip adapted to slidingly engage the top surface of said curved tank wall.

References Cited by the Examiner
UNITED STATES PATENTS

| | | | |
|---|---|---|---|
| 928,144 | 7/1909 | McIlvaine | 99—369 |
| 969,238 | 9/1910 | Wright | 99—404 |
| 2,709,955 | 6/1955 | Hunter | 99—443 |
| 2,788,735 | 4/1957 | Farace | 99—443 |
| 3,152,537 | 10/1964 | Dietz | 99—404 |

WALTER A. SCHEEL, *Primary Examiner.*

R. W. JENKINS, *Assistant Examiner.*